United States Patent [19]

Dudek et al.

[11] Patent Number: 4,622,750
[45] Date of Patent: Nov. 18, 1986

[54] UNIVERSAL MEASURING GAUGE FOR GEOLOGICAL STRUCTURES

[75] Inventors: Josef Dudek; Stanisvlav Adamek, both of Prague, Czechoslovakia

[73] Assignee: Ceskoslovenska akademie ved, Prague, Czechoslovakia

[21] Appl. No.: 794,746

[22] Filed: Nov. 4, 1985

[30] Foreign Application Priority Data

Nov. 2, 1984 [CS] Czechoslovakia .................... 8317-84

[51] Int. Cl.$^4$ ........................................... E21B 47/022
[52] U.S. Cl. ...................................... 33/1 H; 33/304; 33/313; 33/320
[58] Field of Search ................. 33/1 H, 304, 308, 313, 33/316, 320, 322

[56] References Cited

U.S. PATENT DOCUMENTS

| | | | |
|---|---|---|---|
| 1,086,242 | 2/1914 | Sweeny | 33/320 |
| 1,260,097 | 3/1918 | Toyokawa | 33/320 |
| 3,587,176 | 6/1971 | Schnerb | 33/313 |
| 4,542,647 | 9/1985 | Molnar | 33/304 |

FOREIGN PATENT DOCUMENTS 1030706  5/1966  United Kingdom .................. 33/320

Primary Examiner—Willis Little

[57] ABSTRACT

A universal measuring gauge for geological structures is disclosed, having an application part including an arm and a gib, which is normally attached to it on one side, the arm being, on the other side, shaped into a universal bearing journal (pin), which passes through the bearing bush; two opposite axes equipped, on their ends, with normally fixed inclination indicators, radiate from the bush center; a suspension part including two vertical discs with a protractor scale, pivoted on the mentioned axes and firmly connected with the suspension, the lower suspension part being equipped with a transparent horizontal protractor scale and in the center of the lower suspension part, the upper half-bush of the bearing is formed, the bearing being passed by a hollow pin, carrying the transparent horizontal disc with indices, the hollow pin being axially and radially guided (glided) in the upper and lower half-bushes of the bearing; and an orientation part containing the mentioned lower half-bush, where the lower needle end and the directional rod are fixed, possibly in the direction parallel to the direction indicator, the needle passing the hollow pin, a directional marker attached to the needle in the plane of the axial bearing, and the revolving magnetic needle, tangentially pivoted on the top of the needle.

18 Claims, 6 Drawing Figures

4,622,750

UNIVERSAL MEASURING GAUGE FOR GEOLOGICAL STRUCTURES

BACKGROUND OF THE INVENTION

The invention concerns a universal measuring gauge for geological structures in general, designed in particular for supported mine openings, the construction of which enables the taking of accurate and quick measurements of the spatial orientation of planar and linear geological structural elements not only on free ground, but also in the surroundings affected by a geomagnetic field.

Up to the present, the spatial orientation of planar and linear structural elements has usually been measured by geological compasses of various types.

A disadvantage of the currently employed geological compasses is their unreliable or even entirely incorrect measurements of horizontal strikes (bearings), so-called azimuths, in surroundings affected by disturbing magnetic effects, i.e. in practically all sub-surface mines, prospecting mine openings, communication tunnels, and the like. Further disadvantages are related to the necessity of horizontal setting of the compass during azimuth measurements, and the additional requirement of a new application of the compass during dip measurements by means of the clinometer; the difficulty, unreliability, or even impossibility of measurement, by means of the compass, above the horizon of the operator's eyes, in the roof (hanging wall) of the mine workings, and in narrow joints; as well as the difficulty and considerable inaccuracy of the direct measurement of the spatial orientation of steep-dipping linear elements.

While the geological compass proves satisfactory for geological structural measurements on free ground, where it has become a current tool owing in particular to its small, pocket-size dimensions, its application in surroundings affected by a geomagnetic field proves to be entirely inadequate.

Errors in compass measurements are caused by the deformation of the lines of force of a magnetic field in mine workings, due to the presence of ferromagnetic substances in the form of deposits or rock-forming minerals. These deposits or minerals are characterized by high values of magnetic susceptibility and remanent magnetization, and by the related presence of steel equipment, such as supports, exploitation and transport systems, pipelines, etc., with different remanent magnetization of individual structural parts preserved from the steel-chilling stage, and finally, by the effect of intense electric fields formed in the neighborhood of direct current conductors and power consuming utilities.

As a result of their location, the character of the geomagnetic fields within the mine openings reflects the action of a considerable number of various partial effects subjected to mutual interference. The overall result is either an increase or a decrease of their disturbing effects. This is why such a conspicuous variability has been recorded for the course of lines of force of the locally affected geomagnetic field and the associated changes of the magnetic needle bearings of geologic compasses.

In principle, the simplest device, having measurements independent from the presence of the magnetic field, and thereby enabling one to measure direction angles between structural elements and the axis of the mine opening, is composed of a protractor half-scale with a revolving arm extended to both sides. Measurements by means of this device are based upon a reading of the arm position (which is applied to the measured plane) on the half-scale of the protractor, the diameter of which is situated in the strike (direction) of the axis of the opening. The precision of measurement is limited, particularly on gently dipping structural planes. The strike direction of steep-dipping lineaments is only estimated approximately. The clinometer of the geological compass can also be used for measurements of the dip (inclination) of structural elements.

A more complicated device, based upon similar principles, is the so-called Koark's diopter-goniometer, which has been employed for structural measurements at Swedish magnetite ore deposits— see H. J. Koark in "Dioptergoniometer fuer Gefuegemessungen im Bereich magnetishcher Erzvorkommen" (Neues Jahrb. Min. Geol., Monatshefte, pp. 169–174, Stuttgart 1951).

The fundamental features of this instrument, applicable only in connection with a theodolite operated by another person, are the half-scale of the protractor, the diameter of which is applied, in horizontal position, to the measured plane; and the revolving arm with levels and two tiny lining rods, normally attached. The strike (direction) of the measured structural plane is calculated (quite intricately) from the geodetically established orientation of the aiming line of the theodolite (situated on a site with good view and aimed at the mutually coinciding lining rods of the diopter-goniometer, their connecting line being identified with the theodolite's aiming line) and the arm position reading on the protractor scale. Broader use of the diopter-goniometer has been prevented by the considerable requirement placed upon operators with regard to specialization and available time.

SUMMARY OF THE INVENTION

It is therefore an object, according to the present invention to develop a geological compass applicable in surroundings affected by a geomagnetic field, free from the errors caused by deformation of the lines of force of the magnetic field.

This object is attained according to the present invention by the universal measuring gauge for geological structures composed of an application part, including an arm and a gib, the gib attached perpendicular to the part on one side, the arm being, on the other side, shaped into a universal bearing journal (pin), which passes through the bearing bush; two opposite axes radiating from the bush center equipped at their ends with normally fixed inclination indicators; a suspension part including two vertical discs with a protractor scale, pivoted on the mentioned axes and firmly connected with the suspension; the lower suspension part is equipped with a transparent horizontal protractor scale with the upper half-bush of the bearing formed in the center of the lower suspension part; the bearing is passed by a hollow pin, carrying the transparent horizontal disc with indices, the hollow pin being axially and radially guided (glided) in the upper and lower half-bushes of the bearing; an orientation part containing the mentioned lower half-bush, where the lower needle end and the directional rod are fixed, possibly in the direction parallel to the direction indicator; the needle passing the hollow pin, with a directional marker attached to the needle in the plane of the axial bearing, and the revolving magnetic needle being pivoted tangentially on the top of the needle.

The measuring device according to the present invention reduces the disadvantages of the known measuring devices, such as:

the necessity of horizontal setting of the compass or diopter-goniometer during directional measurements and the necessity of its repeated application during dip measurements (for the compass with a clinometer), the difficulty, unreliability, or even impossibility of measurements with both mentioned devices above the horizon of the operator's eyes, in the roof (hanging wall) of the mine working, in narrow joint, etc., and the difficulty and considerable inaccuracy of direct measurements of spatial orientation of inclined and particularly steep-dipping linear elements.

The measuring gauge can also be adapted so that the first arresting element for the fixation of the transparent hollow horizontal disc with respect to the horizontal protractor scale is situated in the suspension; moreover, so that the second arresting element for the fixation of the transparent hollow horizontal disc with respect to the direction indicator is situated in the second carrying half-bush; so that the third arresting element for the fixation of the position of the magnetic needle is situated in the bottom of the carrying half-bush, parallel to the needle; so that the gib contains a guide in which is situated the application rod, parallel with the arm, fixable by the fourth arresting element; and so that the fifth arresting element is situated on the contact of the application and closing parts for the fixation of their mutual position and thus, also, the position of dip (inclination) indicators on the vertical protractor scale.

The measuring gauge according to the invention can be improved further by using, on the one hand, geared two-pointer indicators on the vertical protractor system and, on the other hand, a reflex direction finder composed of a telescopic directional rod provided with a leveling diopter or collimator and, possibly, with rectified light sources directed to both sides, adjustable by pivoting, by means of an adjustment screw, into the direction of relation line represented e.g. by the mine track. Further improvement include using a planar mirror suspended on the directional rod, tilting around the axis parallel to the directional rod, or a pair of mirrors perpendicular to each other, or possibly arbitrarily adjustable, suspended beneath the directioning system and illuminated by a tiny source of rectified light, the axis of which is situated in the axial plane of the angle included by both reflection flats (faces), and also being pivotable within that plane.

The advantage of these improvements lies in the possibility of more accurate setting-up (adjustment) of the directional part. The application of the rectified light beam or light plane emitted by e.g. a suitably adapted miner's lamp or a laser beam, can also contribute to the improvements. Moreover, a material object, such as a rod oriented into the known direction, may be employed. Another advantage is found in the improvement in the precision of the reading of angular values, and the possibility of substantial size reduction, namely of the vertical protractor system, resulting in its approaching the horizontal protractor system. The length of the suspending part can then be chosen solely with respect to formation of sufficient moment required for putting the suspension into the vertical position.

The use of suspension hooks or other clips for suspending the surveying cord on the application rod enables the gauge according to the present invention to be used also for geodetic works, for example, for laying-out (i.e. ranging, aligning) of oblique prospect and operation holes in mine openings.

DESCRIPTION OF THE PREFERRED EMBODIMENTS

Figure 1:
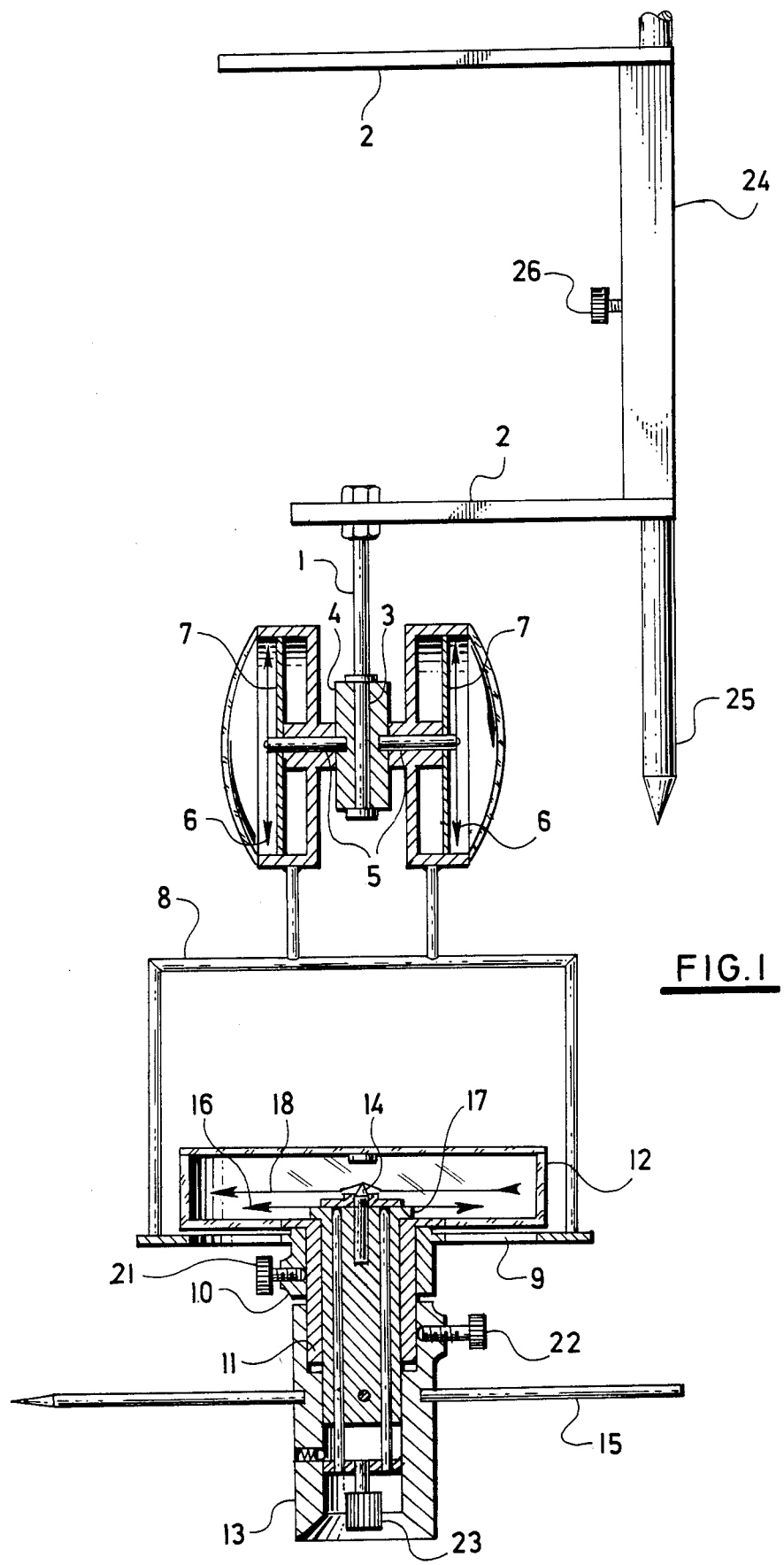
FIG. 1 illustrates the fundamental layout of the measuring gauge according to the invention.

The universal measuring gauge for geological structures according to the present invention as illustrated in FIG. 1 includes the application part, the suspending part, and the orientation part. The application part is formed by the gib 2 attached normally to the arm 1. The arm 1 is modified on its other end, into the journal pin 3. Two opposite axes 5 radiate from the center of the bearing bush 4. The inclination indicators 6 for reading the vertical angles are attached perpendicular to the ends of axes 5. One pair of mutually opposite inclination indicators, denoted e.g. by letters NL, is employed for reading the inclination of normal lines of the measured planes or the inclination of lineaments, and the second pair of indices, denoted e.g. by the letter S, is employed for reading the inclination of slope lines of the measured planes.

Vertical discs 7, divided into four quadrants, are situated at the top of the suspending part of the gauge. Two opposite quadrants are always concurrently designated, for example, by white and red colors or even by different symbols, for example 0 and +. Vertical discs 7 can be revolved about axes 5, and are firmly connected with the suspension 8. A system for the measurement of horizontal angles and azimuths is fixed in the lower part of the suspension 8. The system spontaneously assumes a horizontal position. A transparent horizontal protractor scale 9, tilting together with the application part of the gauge, is situated in the lower part of the suspension 8. The center of the lower part of the suspension is shaped into the upper half-bush 10 of the bearing. It is crossed by the hollow pin 11 of the revolving adjustable transparent hollow horizontal disc 12. The disc 12 has two opposite indices for reading the azimuths of the measured directions of structural elements. The needle 14, passing through the hollow pin 11 is connected on one end (side) with the lower half-bush 13, and is equipped on the other end with the thrust bearing 17. The direction indicator 16 for reading the horizontal angle between the application and suspending parts of the gauge is attached to the needle 14 in the plane of this thrust bearing. The magnetic needle 18 is pivoted on the top of needle 14. The directional rod 15 is fixed to the lower half-bush 13 so that the rod is firmly attached, optimally in mutually parallel position, to the direction indicator 16. The purpose for this particular improvement is to prevent a possible confusion of indices and an erroneous reading of directions (strikes).

The universal measuring gauge for geological structures according to the present invention is equipped, in addition to these features, with four arrestments. The first arrestment element 21 fixes the position of the transparent hollow horizontal disc 12 with respect to the horizontal protractor scale 9. The second arrestment element 22 fixes the position of the transparent hollow horizontal disc 12 with respect to the horizontal direction indicator 16. The first and the second arrestment elements 21, 22 fix the position of the direction rod 15 with respect to the direction of the arm 1. The third arrestment element 23 fixes the position of the magnetic needle 18 with regard to the transparent horizontal protractor scale 9. A guide 24 is provided in the gib 2, in which application rod 25 is located in parallel to the arm 1, the rod being fixable by the fourth arresting means 26.

The universal measuring gauge for geological structures according to the present invention operates so that mutual angular relations among the application part, the suspending part, and the orientation part, read on the protractor scales, represent data concerning the spatial orientation of geological structural planar and linear elements. The vertical angle contained by the application part (gib 2 of which is applied to the planar element, and the application rod of which is applied to the measured linear element) and the suspending part expresses the inclination (dip) of the structural element. The horizontal angle contained by the application part and the orientation part, set into a known direction (e.g. the axial direction of the mine working), represents the angle included by the structural element and the known direction. After a single presetting of the value of azimuth of the relative direction, the azimuth of the measured direction (strike) can be read directly by simply revolving the transparent disc 12.

Figure 2:
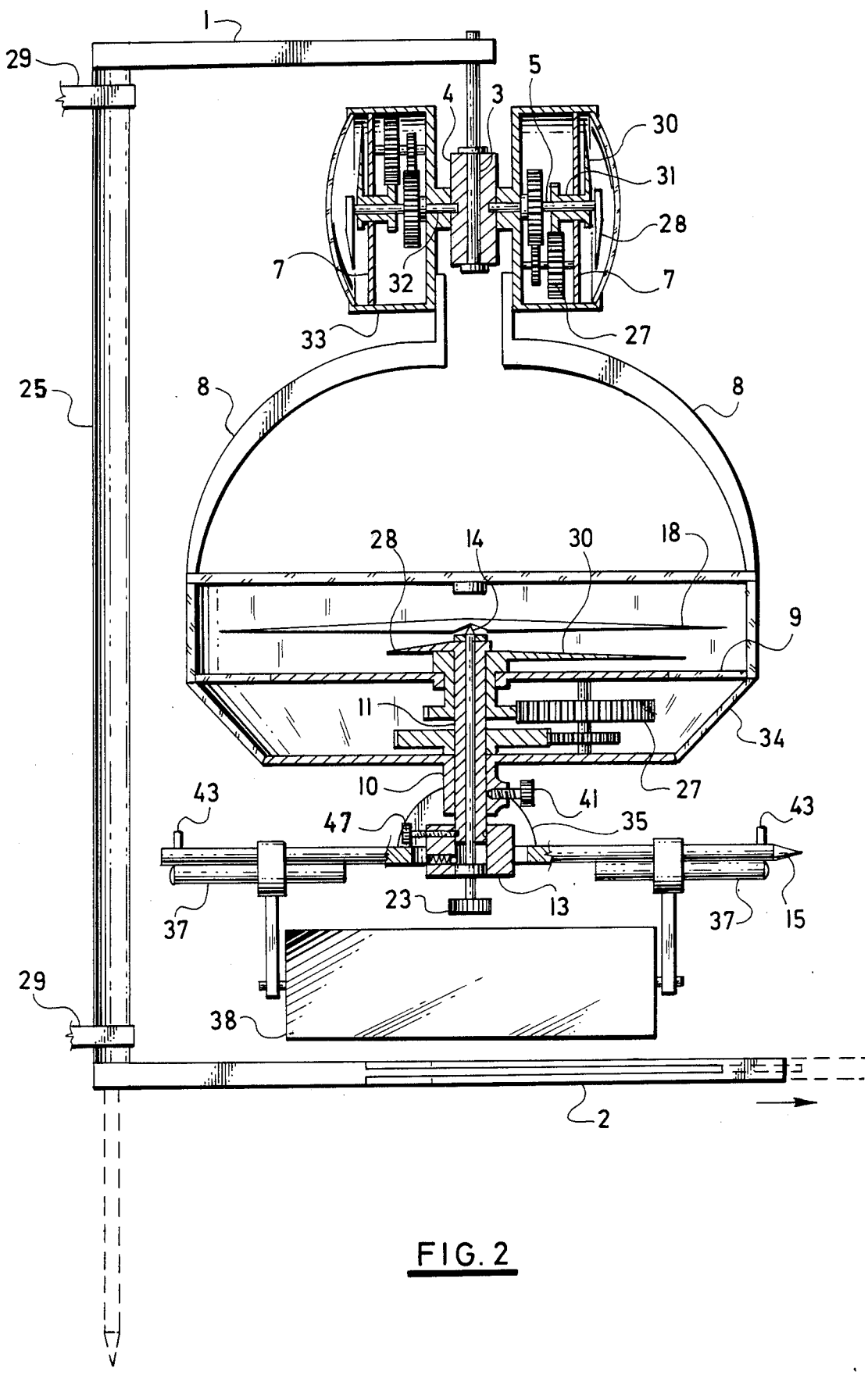
FIG. 2 sets forth the geared measuring gauge provided with the reflection face (flat).
Figure 3:
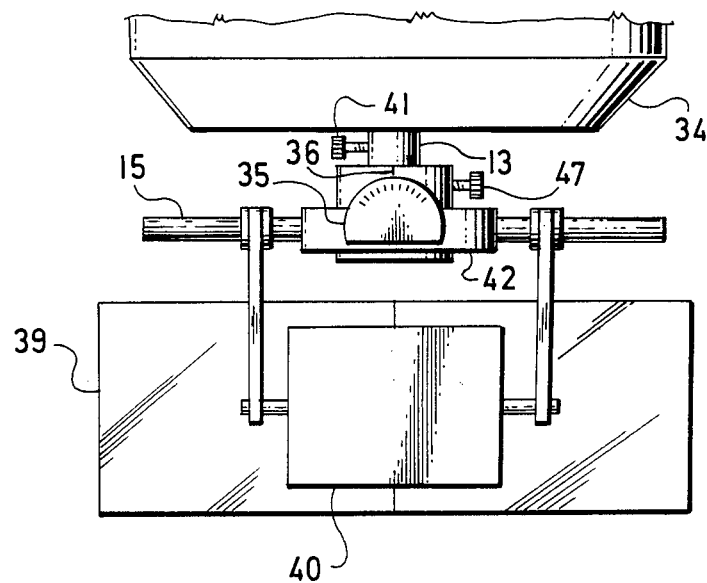
FIG. 3 shows details of another execution of the orientation part.
Figure 4:
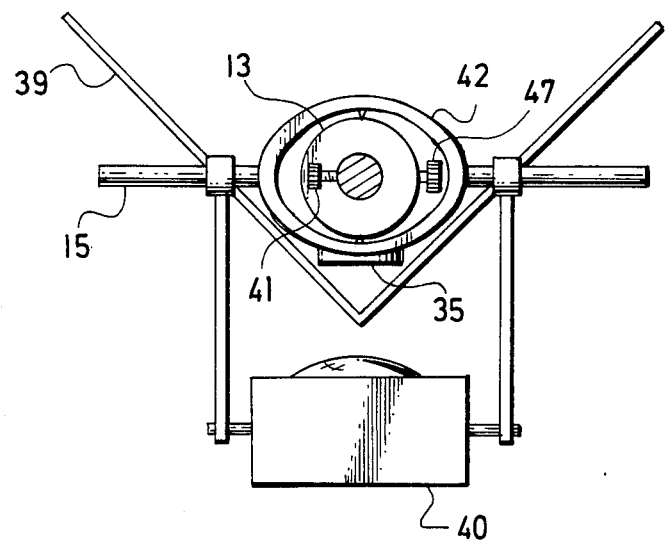
FIG. 4 is similar to FIG. 3, but showing its vertical section.

FIGS. 2, 3, and 4 illustrate schematically the measuring gauge according to present invention, formed by three fundamental parts: the application part, the suspension part, and the orientation part. The application part is composed of a cranked arm 1, the one part of which is formed by a telescopic (retractable) application rod 25 with tiltable grips (catches) 29 and a perpendicularly fastened (disassemblable) gib 2. The arm is modified on the other end into a bearing journal 3. Two opposite axes 5 radiate from the center of the bearing bush 4 and end with a small pointer 28. A device for the conversion into the cube 27 is situated on the axes 5. Its revolutions are transmitted, with acceleration, on a hollow axlet 31, at the end of which is a large revolving pointer 30. The suspension (pending) part is formed by the mantle (casing) 33, in the bottom of which or, possibly, in a vertical disc 7 firmly fixed to which is fitted the thrust bearing 32 in which the axis 5 revolves in relation to the mantle 33. The mantle (casing) 33 is firmly fixed, by means of the suspension 8, to the transparent horizontal protractor scale 9 and the cover 34, where the device for conversion into the cube is situated. The orientation part is composed of a magnetic needle 18, pivoting on the needle top 14, which passes through the hollow pin 11. A small pointer 28 of the double-pointer indicator of horizontal angles and azimuths is attached to this hollow pin. The half-bush (10, 13) is attached to the other side of the hollow pin 11 with shoulders, around which revolves the sleeve 42 of the tiny protractor scale 35, enabling the setting of the inclination of the direction rod 15 with regard to the index 36. The rod can be made telescopically retractable, and be equipped with a diopter 43 or collimator 37 (possibly with tiltable sources of rectified light directed to both sides); the reflection face (flat) 38, pivoting around an axis parallel to the directional rod 15, is slidingly fixed to the directional rod, or, possibly, a pair of mutually normal or even arbitrarily symmetrically adjustable reflection faces (flats) 39 can be suspended from below from the directional part, the faces being illuminated by a tiny source of rectified light 40, the axis of which is situated in the axial plane of the angle included by both reflection faces (flats) 39, and is tiltable therein.

The measuring gauge can be further modified so that an arresting element 41 is situated at the bottom of the suspension part, fixing the mutual position of the orientation part with respect to the suspension part of the device, i.e. of the two-pointer indicator of horizontal angles and azimuths with respect to the horizontal protractor scale 9. Situated at the bottom of the needle 14 is the third arresting element 23 for the fixation of the magnetic needle 18, or another arresting element may possibly be situated between the application and suspension parts, for the fixation of the position of the two-pointer inclination (dip) indicator with respect to the vertical protractor scale. Moreover, the measuring gauge is equipped with rectifying screws of the two-pointer inclination indicator and a rectifying screw of the two-pointer indicator of horizontal angles and azimuths, which may be used for setting this indicator with regard to the horizontal protractor scale 9 to the value of a known (relative) direction, this being possible e.g. for the case of identification of the direction of the application rod 25 with the direction of the directional rod 15.

Figure 5:
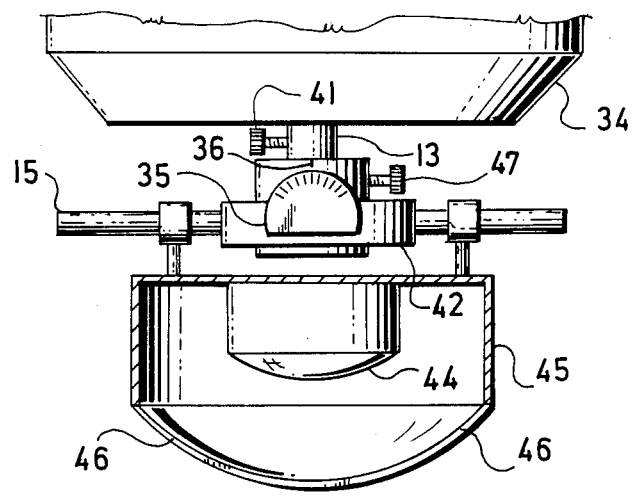
FIG. 5 presents yet another possible execution of the orientation part.
Figure 6:
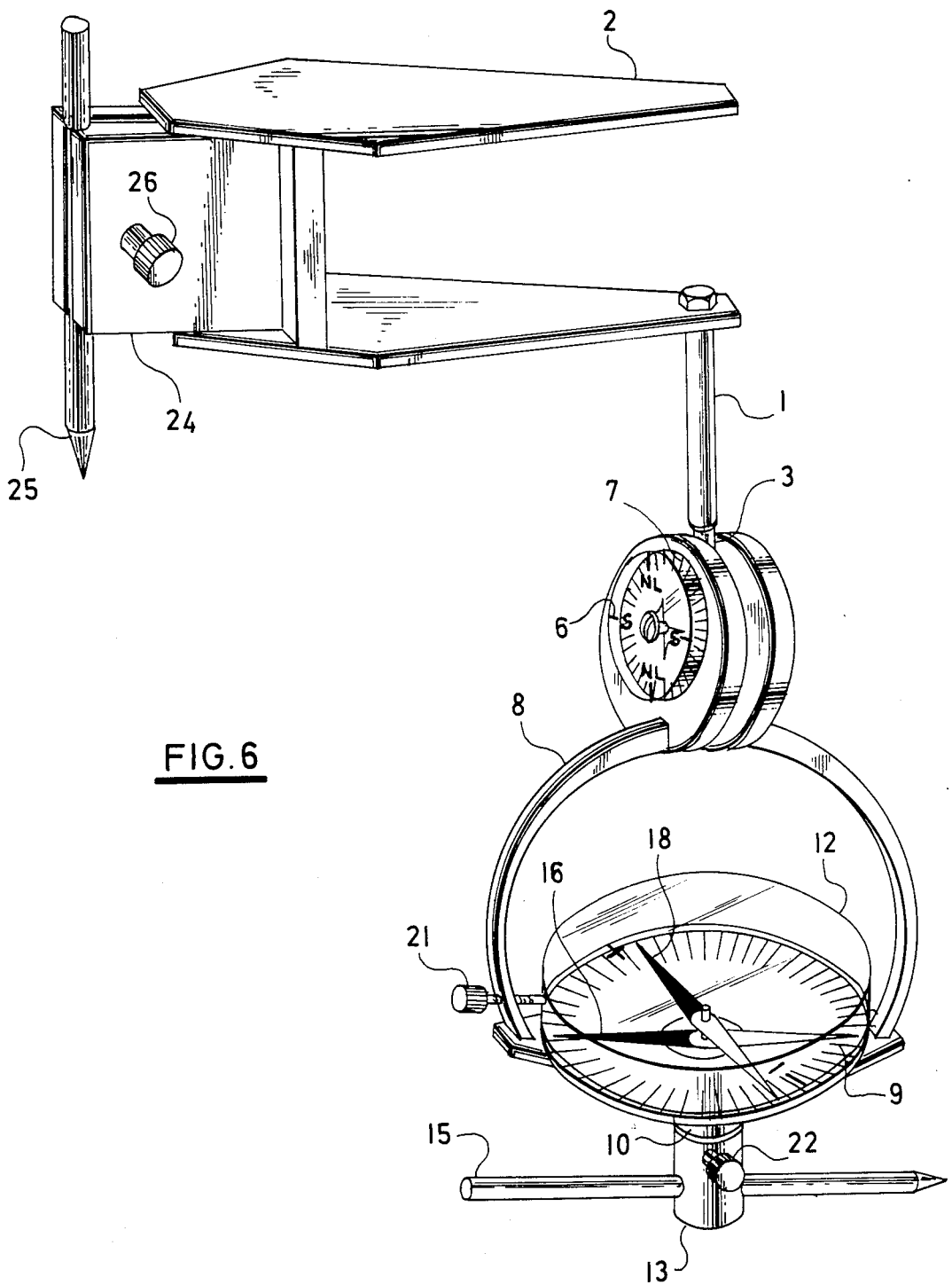
FIG. 6 is a broken-away view of the measuring gauge.

FIG. 5 illustrates the orientation part of the gauge, on the directional rod 15 of which is suspended a light source 44, this light source being situated in a sleeve 45 with a slot 46, tiltable around the axis either parallel or identical with the direction rod 15.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. A universal measuring gauge for geological structures, comprising
an application part;
a suspension part; and
an orientation part;
said application part includes
an arm,
a gib attached normal to said arm on one side thereof,
said arm is shaped on another side thereof into a journal of a universal bearing,
said journal passes through a bush of said universal bearing,
two axes radiate in opposite directions from the center of said bush, and
inclination indicators attached normal to the end of each said axes;
said suspension part includes
two vertical discs with protractor scales, each pivoted on a said axis,
a suspension firmly connected to each said vertical discs,
a transparent horizontal protractor scale disposed at a lower part of said suspension,
an upper half-bush of a second bearing disposed in the center of said lower part of said suspension, a hollow pin passes through said second bearing,
said hollow pin is axially and radially slide-guided in said upper half-bush of said second bearing, and
a transparent horizontal disc is carried on said hollow pin; and
said orientation part includes
a lower half-bush of said second bearing,
said hollow pin is also axially and radially slide-guided in said lower half-bush of said second bearing,
a needle is mounted at its lower part in said lower half-bush of said second bearing,
said needle passes through said hollow pin,
a directional rod is mounted in said lower half-bush of said second bearing,
a thrust bearing is attached adjacent the top of said needle,
a direction indicator is attached to said needle in the plane of said thrust bearing, and
a magnetic needle is pivoted above said direction indicator on said top of said needle.

2. The universal measuring gauge according to claim 1, wherein
said directional rod is mounted parallel to said directional indicator.

3. The universal measuring gauge according to claim 1, further comprising
a first arresting element is disposed in said suspension,
said first arresting element is for fixation of said transparent horizontal disc with respect to said horizontal protractor scale.

4. The universal measuring gauge according to claim 1, further comprising
a second arresting element is disposed is said lower half-bush of said second bearing,
said second arresting element is for fixation of said transparent horizontal disc with respect to said direction indicator.

5. The universal measuring gauge according to claim 1, further comprising
a third arresting element is disposed at the bottom of said lower half-bush of said second bearing, parallel to said needle,
said third arresting element is for fixation of the position of said magnetic needle.

6. The universal measuring gauge according to claim 1, further comprising
an application rod and
a guide for said application rod, said guide is formed in said gib,
said application rod is slidingly guided by said guide, parallel to said arm, and
a fourth arresting element is disposed in said guide,
said fourth arresting element is for fixation of said application rod.

7. The univerisal measuring gauge according to claim 1, further comprising
a two-pointer geared inclination indicator is attached to said axis adjacent said vertical discs with protractor scales,
a rectifying screw for setting angular values of said geared inclination indicator,
a second protractor scale with index are attached to said lower half-bush of said second bearing,
said second protractor scale and index are for setting the inclination of said directional rod, and
a flat reflection face is slidingly fixed below said directional rod, revolvable about said axis parallel or identical with said directional rod.

8. The universal measuring gauge according to claim 1, further comprising
a two-pointer geared indicator is attached to said hollow pin adjacent said horizontal protractor scale.

9. The universal measuring gauge according to claim 1, further comprising
a diopter is attached to said directional rod.

10. The universal measuring gauge according to claim 1, further comprising
a collimator is attached to said directional rod.

11. The universal measuring gauge according to claim 9, further comprising
a tiltable source of rectified light is attached to said directional rod,
said source of rectified light is directed to both sides of said directional rod.

12. The universal measuring gauge according to claim 10, further comprising
a tiltable source of rectified light is attached to said directional rod,
said source of rectified light is directed to both sides of said directional rod.

13. The universal measuring gauge according to claim 1, further comprising
a pair of mutually normal reflection flats is suspended from said orientation part, and
said flats are illuminated by a tiny source of rectified light attached to said directional rod,
said source of light possess an axis situated within the axial plane of the angle contained by both reflection flats and is tiltable within said plane.

14. The universal measuring gauge according to claim 1, further comprising
a pair of arbitrarily symmetrically adjustable reflection flats is suspended from said orientation part, and
said flats are illuminated by a tiny source of rectified light attached to said directional rod,
said source of light possesses an axis situated within the axial plane of the angle contained by both reflection flats and is tiltable within said plane.

15. The universal measuring gauge according to claim 1, wherein
said directional rod is telescopically retractable.

16. The universal measuring gauge according to claim 1, wherein
said directional rod is tiltable.

17. The universl measuring gauge according to claim 1, wherein
said gib is retractable.

18. The universal measuring gauge according to claim 1, further comprising
tiltable grips are provided on said application rod, and
said application rod is retractable.

* * * * *